J. G. ROBBINS.
PRETZEL MAKING MACHINE.
APPLICATION FILED JULY 30, 1919.

1,397,233.

Patented Nov. 15, 1921.

Inventor:
James G. Robbins,
By Chas. N. Butler
Attorney.

J. G. ROBBINS.
PRETZEL MAKING MACHINE.
APPLICATION FILED JULY 30, 1919.

1,397,233.

Patented Nov. 15, 1921.
6 SHEETS—SHEET 6.

Inventor:
James G. Robbins,
By Chas. N. Butler
Attorney.

UNITED STATES PATENT OFFICE.

JAMES G. ROBBINS, OF LANCASTER, PENNSYLVANIA, ASSIGNOR TO AMERICAN PRETZEL COMPANY, OF PHILADELPHIA, PENNSYLVANIA, A CORPORATION OF WEST VIRGINIA.

PRETZEL-MAKING MACHINE.

1,397,233.      Specification of Letters Patent.      Patented Nov. 15, 1921.

Application filed July 30, 1919. Serial No. 314,317.

*To all whom it may concern:*

Be it known that I, JAMES G. ROBBINS, a citizen of the United States, residing at Lancaster, in the county of Lancaster and State of Pennsylvania, have invented certain Improvements in Pretzel-Making Machines, of which the following is a specification.

My invention is characterized by its improved coördinated means for making pretzels from a mass of dough to desired completed forms by a continuous operation.

In the operation of my improved machine, in its preferred form, the dough is forced from a mass through an aperture in a continuous strip which is cut into sections and delivered to a traveling belt. The belt carries the sections of dough continuously under a board having adjustable parts in contact with which they are rolled and by which they are given the desired shape for subsequent manipulation. A grooved transfer roller passes the formed sections of dough from the belt to an inclined plane which delivers them to supporting fingers from which free ends of the sections depend. A revolving manipulating mechanism is provided with oscillatory means having a form by which the sections of dough are lifted from the supporting fingers and with revolving means for engaging the ends of and twisting the strips or sections of dough held upon the form, the oscillatory means holding the twisted product, trimming its ends, pressing the parts together and delivering the formed pretzels to a conveyer for removing them.

The nature of my invention will be more fully understood by reference to the following description and the accompanying drawings in illustration thereof.

In the drawings, Fig. 5 is a similar view taken on the line $5^x$—$5^x$ of Fig. 3. Fig. 6 is a broken enlarged sectional view taken on the line $6^x$—$6^x$ of Fig. 3.

The invention, in the form thereof illustrated in the drawings, comprises a frame 1 which has journaled therein the shaft 2 provided with an idle pulley $3^1$ and a fixed pulley 3 driven by the belt 4, the shaft having fixed thereon a pinion 5. This pinion engages and drives a spur wheel 6 fixed on a shaft 7 which is journaled in the frame and has a sprocket wheel 8 fixed thereon. A sprocket chain 9 connects the sprocket wheel 8 with a sprocket wheel 10 which is fixed on the shaft 11 journaled in the frame. The shaft 11 has fixed thereon the sprocket wheel 12 which is connected by a sprocket chain 13 with a sprocket wheel 14 fixed on the shaft 15 journaled in the frame, the latter shaft having fixed thereon the bevel gear 16 which drives a bevel gear 17 fixed on a journaled shaft 18. The shaft 15 carries a corrugated or channeled roller or drum 19 which is revolved in the hopper 20 and forces dough from a mass therein through the outlet 21 which is adjustable in size by the slide 22, the latter being set by means of a screw 23. The shaft 18 has fixed thereon a sprocket wheel 24 connected by a sprocket chain 25 with a sprocket wheel 26, the latter being fixed on a journaled shaft 27. The shaft 27 carries the cutters 28 which it revolves across the aperture 21 to cut the strip of dough fed continuously from the hopper through the aperture into sections of the desired length, the sections being delivered to the chute 29.

A second sprocket wheel 30 fixed on the shaft 11 drives a sprocket chain 31 which passes over a sprocket wheel 32 fixed on the shaft 15 to facilitate the operation of the latter.

The sections of dough 57 are delivered by the chute 29 upon a carrier belt 33 which passes over the wheels 34 fixed on the shaft 35 journaled at the end of the machine adjacent to the hopper and over the wheels 36 on the shaft 37 journaled at the opposite end of the machine. The shaft 35 is journaled in the blocks 38 which are movable in the bearings 39 by the screws 40 to adjust the tension of the carrier belt 33.

The shaft 37 has fixed thereon a sprocket wheel 41 which is connected by a sprocket chain 42 with a sprocket wheel 43 fixed on the shaft 7, by which the shaft 37 is driven to operate the belt or conveyer mechanism.

The upper section of the belt 33 is carried over a table 44 beneath the boards 45 and 46 which are connected longitudinally by a flexible joint comprising the cylindrical tongue $45^1$ on the board 45 disposed in the cylindrical groove $46^1$ in the section 46. These boards 45 and 46 are provided with the respective arms 47 and 48 which are fixed adjustably by nuts 49 and 50 on the respective threaded stems 51. Angles 52 and 53 on the respective boards 45 and 46 have their upright legs connected by screws 54 provided with the thumb nuts 55 and 56. The nuts are adjustable on the respective screws to vary the relation between these upright legs and consequently of the boards 45 and 46 so that they may be given the proper inclination for rolling the sections of dough 57 through the form 58 to the desired form $58^a$.

The strips $58^a$ are delivered continuously by the belt 33, as it passes over the wheels 36, to a convex bridge 59 which is pivoted upon the bearing 60, and thence to the transfer drum 61 containing the longitudinal channels or pockets $61^1$, the bridge being operated by a tension member 62 connecting it with the lever 63 to pass between such bridge and the belt any defective sections of dough which it is desired to discard.

The drum 61 is fixed on a journaled shaft 64 which is revolved by a sprocket wheel 65 fixed thereon, the sprocket wheel being connected by a sprocket chain 66 with a sprocket wheel 67 fixed on a journaled shaft 68. This shaft 68 is connected by a sprocket wheel 69 fixed thereon with a chain 70 which passes over and is driven by a sprocket wheel 71 fixed on the shaft 37, whereby the drum 61 is operated in synchronous relation with the mechanism for cutting and carrying the rolled sections of dough thereto.

The rolled sections of dough $58^a$ delivered to the pockets $61^1$ are carried therein by the drum 61 to the inclined bridge 72 over which they roll to the fingers 73 fixed thereon, succeeding sections hanging from the fingers assuming the form $58^b$ with depending ends in the guides 74.

Figure 12:
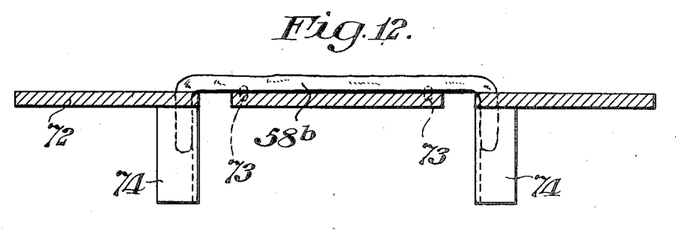
Fig. 12 is a sectional view taken on the line $12^x$—$12^x$ of Fig. 8.

A frame 75, fixed on the revolving shaft 68 and provided with steadying stub shafts $75^1$ carrying rollers $75^{11}$ movable in the circular ways $75^a$, carries a journaled shaft 76 having a plate 77 fixed thereto. A form 79 containing the recessed parts 80 and 81 is fixed on and projects from the plate 77 so that as the latter is held vertically and moves vertically the form passes between the fingers 73 and picks up the bent section of dough $58^b$ supported thereby as illustrated in Fig. 12, the section assuming the position and the form $58^c$ illustrated in Fig. 13.

The oscillatory plate 77 is rocked, to secure the desired positions thereof as it moves through its orbit, by a pinion 82 fixed on its shaft 76 and its engaging spur wheel 83 journaled on the stub shaft 84 which is carried by the frame 75, the wheel 83 having fixed thereto an arm 85 provided with a roller 86 which is adapted to run in the cam ways 87 and $87^a$ of the frame 1.

The frame 75 has journaled therein the stub shaft 88 with its axis in a plane passing through the center of the form 79 at right angles to the axis of the frame, the respective ends of the shaft having fixed thereon the cross bar 89 and the beveled gear 90. The gear 90 is engaged by a beveled gear 91 fixed on a shaft 92 which is journaled on the frame 75 parallel to its axis, the shaft having fixed thereon a star wheel 93 adapted to be engaged and turned by studs or pins 94 fixed in a circular arc on the frame in the path of the star wheel, the action of the set of pins or studs on the star wheel effecting a complete revolution of the bar 89. The bar 89 is provided with the fingers 95 adapted to rock in the bearings 96 against the actions of the respective springs 97, the fingers being engaged by stationary cams 99 to withdraw them from the bar as the latter is moving upwardly in parallel relation to the axis of the frame 75.

Figure 1:
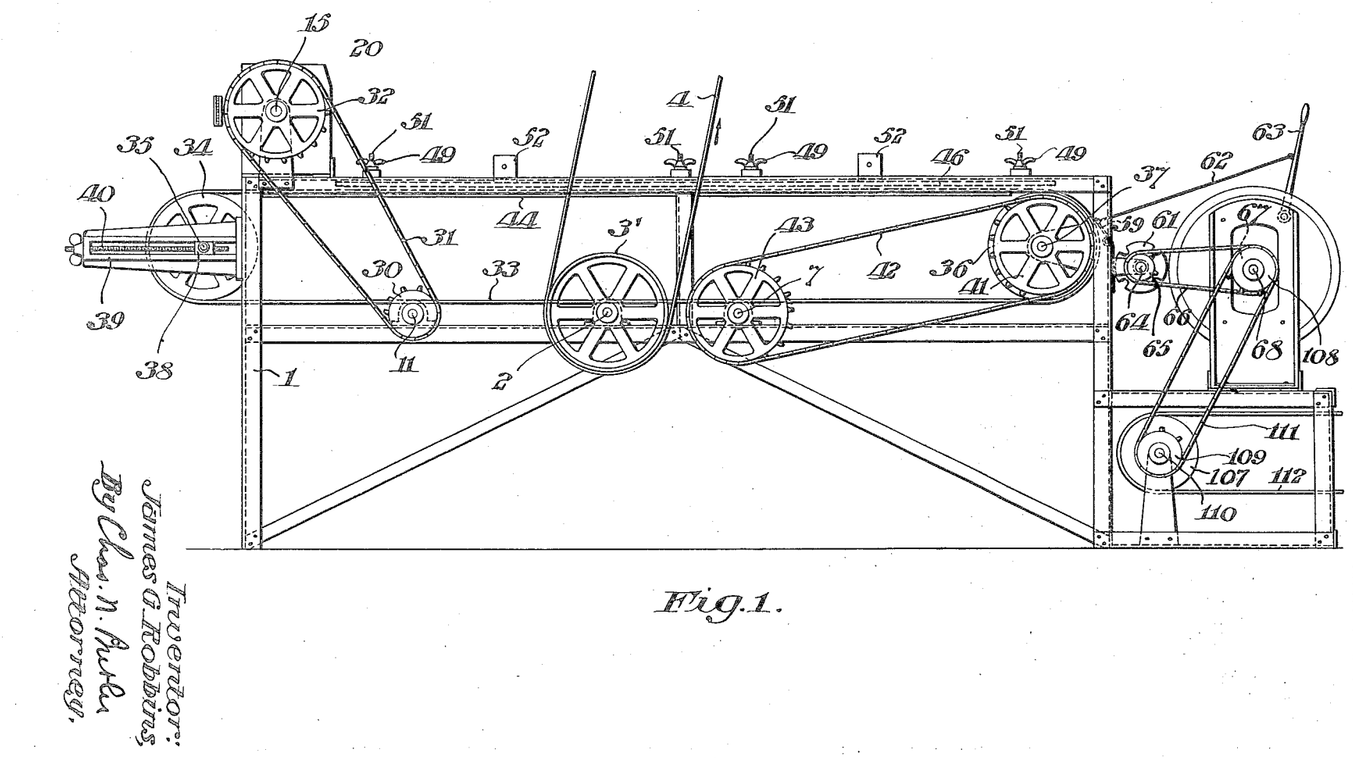
Figure 1 is a side elevation of a machine embodying my improvements.
Figure 2:
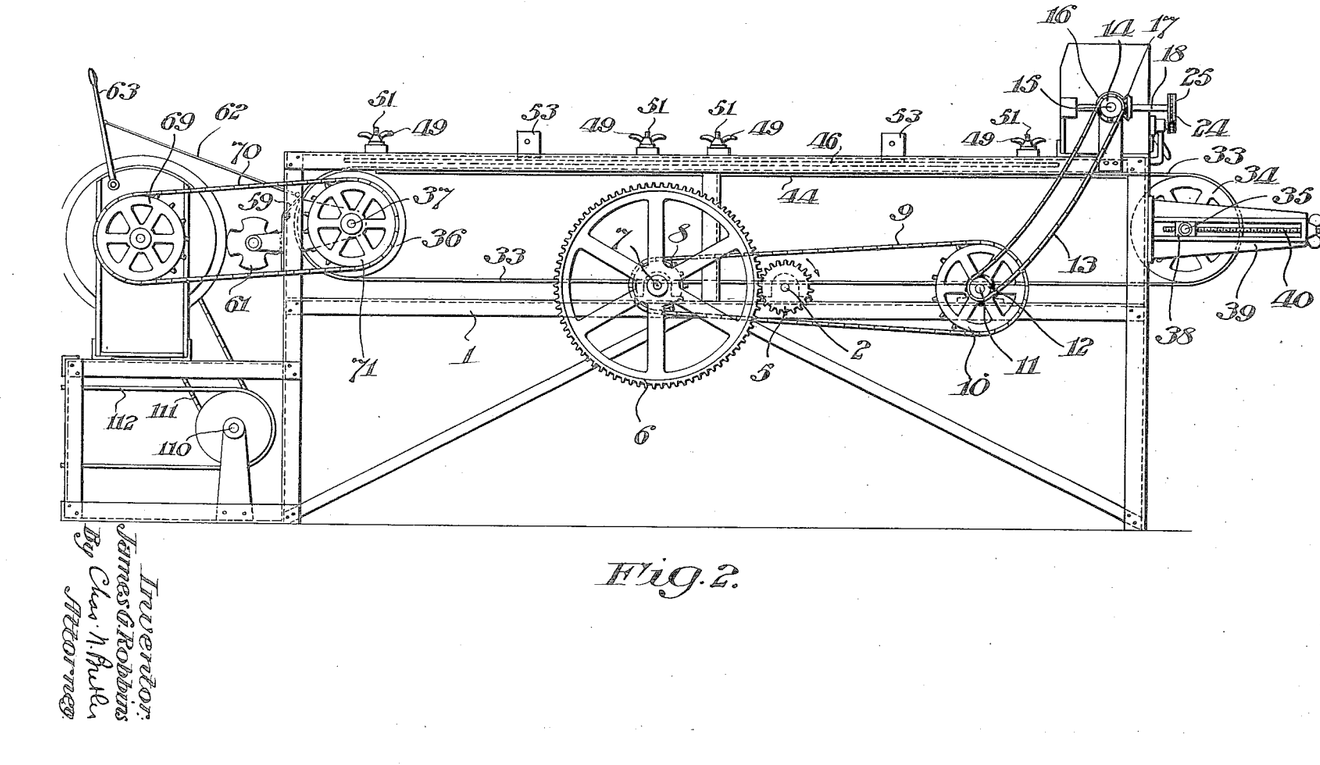
Fig. 2 is an elevation of the opposite side of the same.
Figure 3:
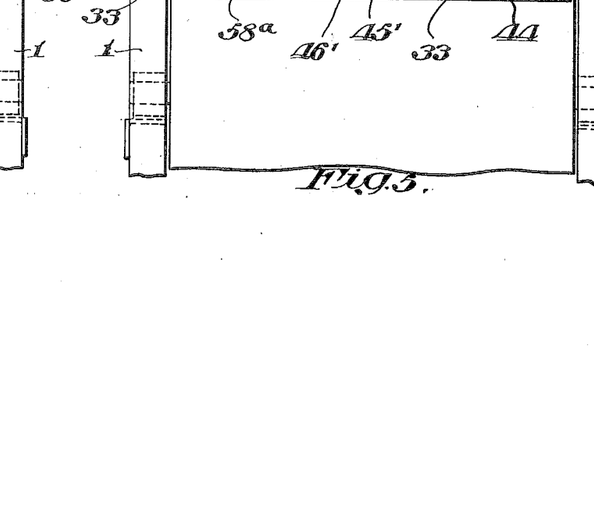
Fig. 3 is a top plan view of the machine.
Figure 4:
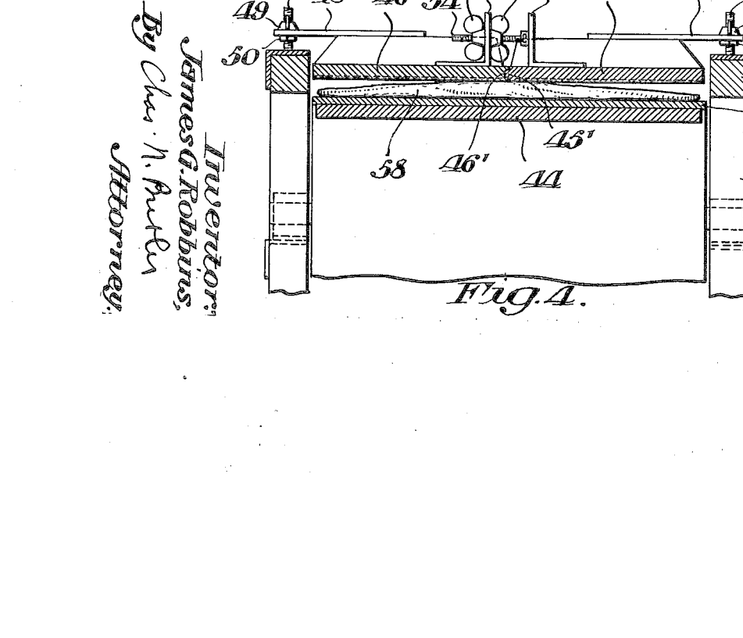
Fig. 4 is a broken enlarged sectional view taken on the line $4^x$—$4^x$ of Fig. 3.
Figures 6, 7A:
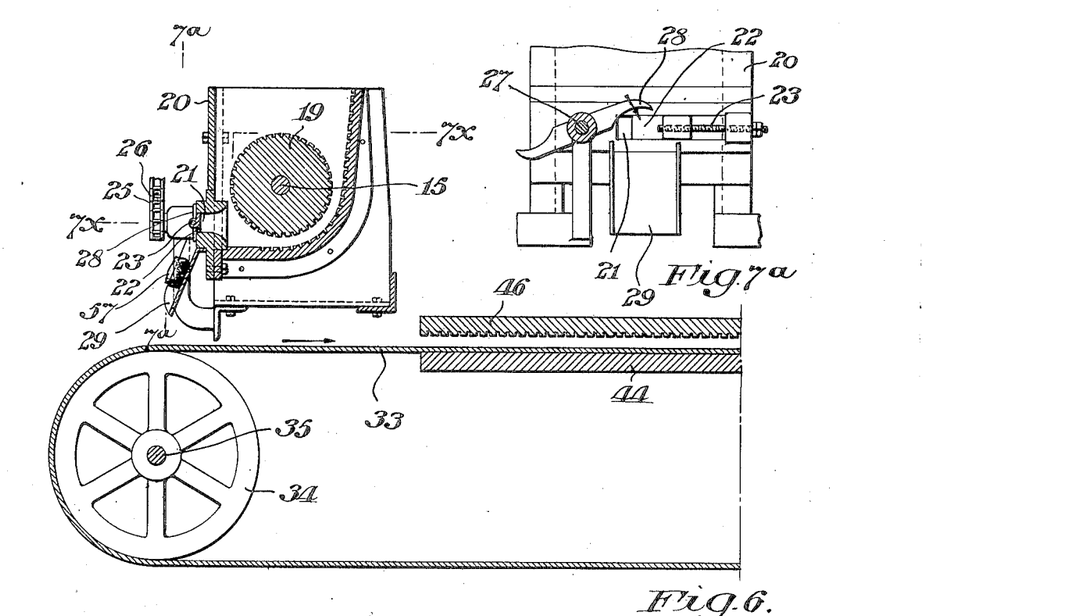
Figure 7:
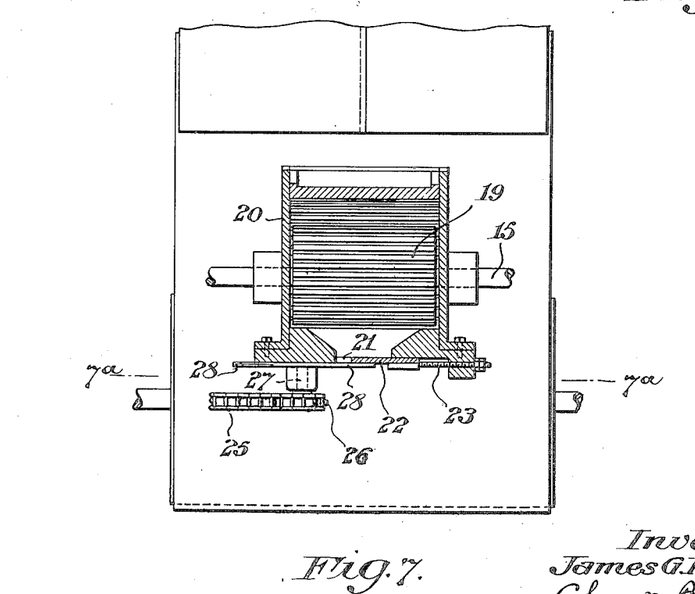
Fig. 7 is a broken sectional view taken on the line $7^x$—$7^x$ of Fig. 6. Fig. $7^a$ is a view on the line $7^a$—$7^a$ of Figs. 6 and 7.
Figures 8, 10, 11:
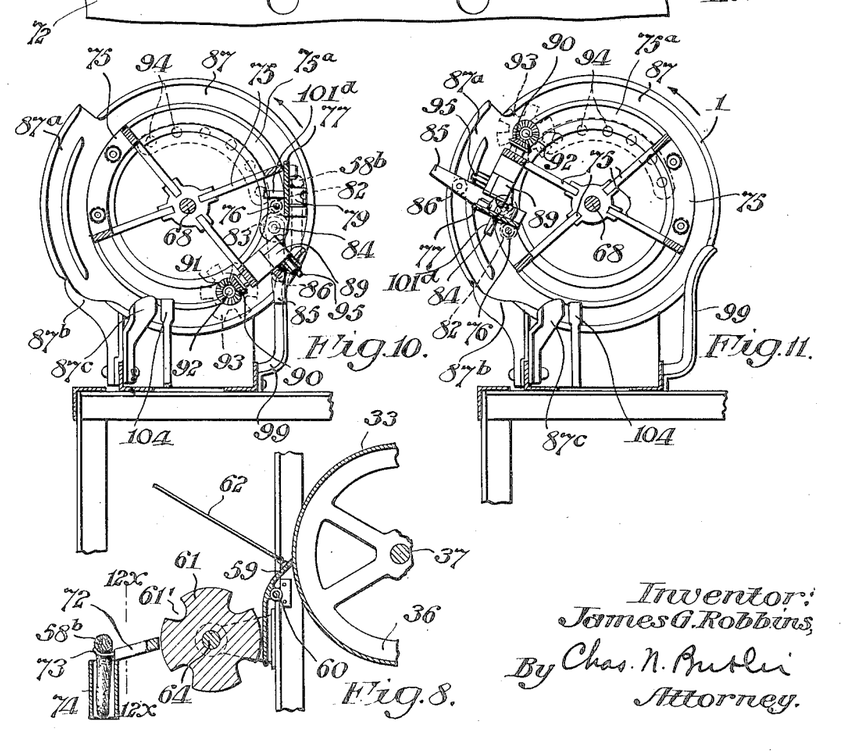
Fig. 8 is a broken sectional view of transfer, supporting and shaping mechanism.
Fig. 10 is a sectional view taken on the line $10^x$—$10^x$ of Fig. 9.
Fig. 11 is a sectional view similar to Fig. 10, illustrating a second position of the same mechanism.
Figure 9:
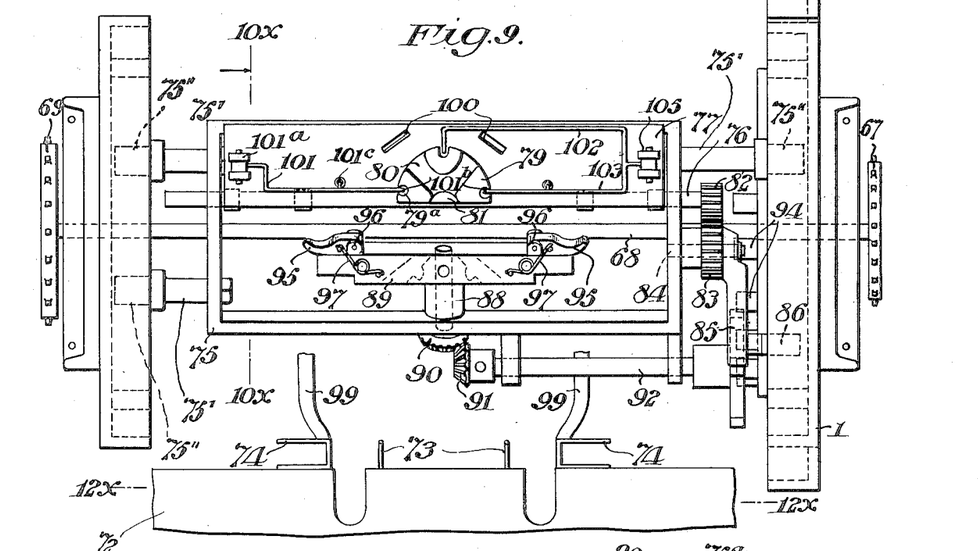
Fig. 9 is an enlarged plan view of means for twisting, folding and trimming the rolled and bent sections of dough.
Figure 13:
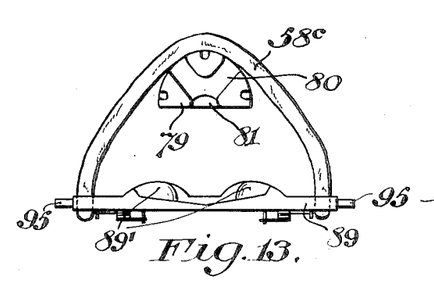
Fig. 13 illustrates diagrammatically a section or strip of rolled dough in the form it assumes when picked up by the rotary manipulating mechanism as well as details of the mechanism for twisting it at the beginning of its operation.
Figure 14:
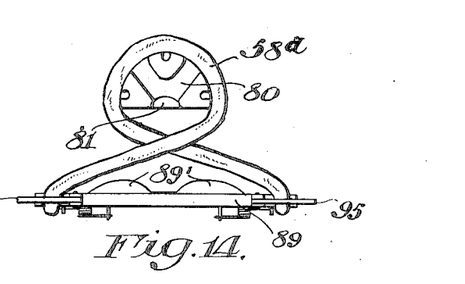
Fig. 14 is a diagrammatic view of the looped section or strip of rolled dough and the twisting mechanism in the next stage of the operation.
Figure 15:
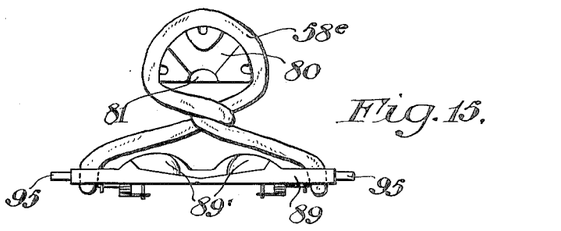
Fig. 15 is a diagrammatic view of the twisted section of rolled dough and the corresponding position of the twisting mechanism.
Figure 16:
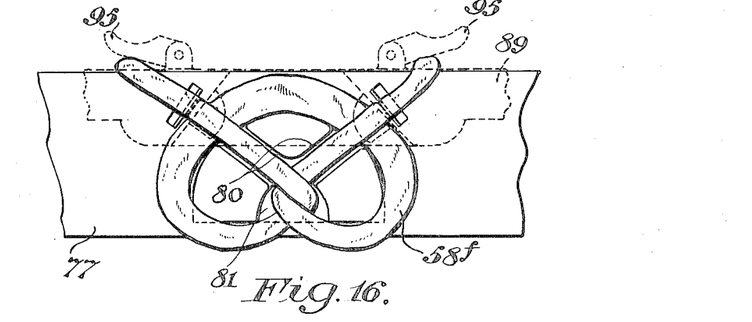
Fig. 16 is a diagrammatic view of the folded, trimmed and finally formed pretzel together with details of the folding and trimming means.

As the frame 75 passes from the position shown in Fig. 10 upwardly, the form 79 first picks up the section of dough $58^b$ and then the cams 99 open the fingers 95 so that as the ends of the section $58^b$ are drawn clear of the guides 74 they drop between the ends of the bar 89 and the retracted fingers, the latter (when released from their engagement with the cams 99) closing and gripping the ends of the section of dough. The star wheel 93 now engages the first of the studs or pins 94 which act successively thereon to turn the bar 89, by means of the intermediate mechanism described, through a complete revolution and, when the roller 86 reaches the end of the inner cam way 87, it moves outwardly into the outer way 87ª through the action of gravity on the arm 85. This causes the gear wheel 83 to turn the gear wheel 82 so that the plate 77 is rocked from a position substantially tangential to its orbit as shown in Fig. 10 to the position transverse thereto illustrated in Fig. 11. The bowed section of dough 58ᶜ as illustrated in Fig. 13 has its ends drawn out and is twisted and folded, the ends being crossed with the production of the form 58ᵈ as illustrated in Fig. 14, then twisted to the reverse positions with the production of the form 58ᵉ as illustrated in Fig. 15, and then folded and trimmed with the production of the form 58ᶠ as illustrated in Fig. 16. In this operation, the plate 77 folds the loop of the form 58ᵉ back upon the ends which enter the channels 80 and cross the convex parts or rounded projections 89¹ of the bar 89 (the knot of the pretzel entering the recess 81) whereby the ends are pressed into the loop and the cutters 100 on the plate shear the ends flush with the loop.

When the roller 86 has reached the end of its course through the way 87ª, it engages the cams 87ᵇ, which deflects the arm 85 and causes the wheel 83 to turn the pinion 82, thereby throwing the plate 77 to its position substantially tangent to its orbit.

The pretzel is detached from the plate 77 by the knock-off arms 101, 102 and 103 which extend under it and lie against the plate. The arm 101 has a hinged connection 101ª with the plate, the end 101ᵇ which lies in the opening 79ª in the form 79, the spring 101ᶜ for drawing the arm toward the plate and the arm 101ᵈ which strikes the cam 104 to rock it for the purpose of throwing off the pretzel. The connected arms 102 and 103 have a hinge 105 on the plate, the ends 101ᵇ which lie in openings 79¹¹ in the form and the retractile spring 101ᶜ, being operated to throw off the pretzel similarly to the arm 101.

The pretzels are delivered from the form 79 to a belt conveyer 112 which passes over a wheel 107 on a journaled shaft 110, the shaft being revolved by a sprocket wheel 109 fixed thereon and connected by a sprocket chain 111 with a sprocket wheel 108 fixed on the shaft 68.

This mechanism, by its rolling, twisting and pressing operations described, produces a dough and a product similar in character and form to the product produced by hand operations.

Having described my invention, I claim:

1. In a pretzel making machine, the combination of means for producing from a mass of dough sections of substantially uniform volume, synchronized means comprising a traveling belt to which said sections are delivered and a board above said belt for rolling said sections, synchronized means for twisting the rolled sections, and synchronized means for folding the twisted sections.

2. In a pretzel making machine the combination of means for producing from a mass of dough sections of substantially uniform size, synchronized means comprising a traveling belt to which said sections are delivered and a board above said belt for rolling said sections, means to which said belt delivers for forming the rolled sections in open loops, synchronized means for gripping the ends of the open loops and twisting them to form closed loops with projecting ends, synchronized means for folding the open loops upon the projecting ends and pressing them together, and synchronized means for trimming said ends.

3. In a pretzel making machine, the combination of a dough hopper having an outlet, means for forcing dough from said hopper in a continuous strip through said outlet, means for cutting said strip into sections, means comprising a traveling belt and a board above said belt for rolling said sections, means for receiving said rolled sections from said belt and suspending them so that they form open loops, rotating means for picking up said open loops, rotary means for gripping the ends of said open loops and twisting them to the form of closed loops with projecting ends, oscillatory means for folding and pressing said closed loops on said projecting ends, and cutting means for trimming said projecting ends.

4. In a pretzel making machine, the combination with a dough hopper having an adjustable outlet, a revolving device for forcing dough through said outlet, a revolving knife for cutting the dough forced through said outlet into sections, a traveling carrier belt to which said sections are delivered, a board having adjustable sections in contact with which said belt rolls said sections of dough, and coördinated means for receiving, looping, twisting, folding and trimming the rolled sections.

5. In a pretzel making machine, a traveling carrier belt, a stationary board in contact with which said belt is adapted for rolling sections of dough, a revolving carrier, a movable bridge for delivering said rolled sections to or diverting them from said revolving carrier, means comprising suspending fingers to which said revolving carrier delivers sections of dough aforesaid, rotary means comprising an oscillatory means for taking said sections from said fingers, and a rotary mechanism carried by said rotary means for twisting the ends of said sections so as to form closed loops with oppositely projecting ends, and means for rocking said oscillatory means to fold said loops on said ends.

6. In a pretzel making machine, a traveling carrier belt, a board having sections provided with a longitudinal joint above said belt in contact with which sections of dough are rolled by said belt, means for adjusting the sections of said board to the desired relation to said belt, a grooved roller, an oscillatory bridge for passing rolled sections of dough from said carrier to said roller or diverting them therefrom, means comprising fingers for receiving and suspending as open loops said sections of dough delivered from said roller, revolving means provided with an oscillatory holder for taking said open loops from said fingers and a device for twisting the ends of said loops together to form closed loops with oppositely projecting ends, and means for rocking said holder and folding said closed loops on said projecting ends in sequence with said twisting operation.

7. In a pretzel making machine, a revolving frame, a loop holder mounted to oscillate on said frame, a bar provided with grippers mounted to rotate on said frame, means comprising a cam for oscillating said holder periodically in the rotation of said frame, means comprising a cam for opening said grippers periodically in the revolution of said frame, and means for revolving said bar periodically between the opening of said grippers and the oscillation of said holder.

8. In a pretzel making machine, a revolving frame, a loop holder mounted to oscillate on said frame, a bar provided with automatically closing grippers mounted to rotate on said frame, cam mechanism in the path of said grippers for opening, then periodically in the revolution of said frame, means comprising power transmitting mechanism connected with said bar for rotating it and stationary mechanism in the path of said power transmitting mechanism to operate it in sequence with the opening of said grippers, and means comprising cam mechanism for rocking said holder periodically in its revolution with said frame, in sequence with the rotation of said bar.

9. In a pretzel making machine, a revolving frame, an oscillatory holder carried by said frame, a revoluble bar provided with automatically closing grippers carried by said frame, oscillatory knock-off mechanism carried by said holder, means for periodically opening said grippers in the revolution of said frame, means for periodically revolving said bar in the revolution of said frame in sequence with the opening and automatic closing of said grippers, means for periodically rocking said holder in sequence with the revolution of said bar, and means for periodically rocking said knock-off mechanism in sequence with the rocking of said holder.

10. In a pretzel making machine, the combination with stationary mechanism comprising cam mechanism and means for revolving a wheel, of a rotary frame journaled relatively to said stationary mechanism, an oscillatory holding device mounted in said frame, a gear fixed to said device, a gear journaled relatively to said frame and engaging said gear first named, means connected with said gear second named and controlled by said cam mechanism for rocking said device periodically, a bar provided with grippers journaled relatively to said frame and mechanism whereby said means first named revolves said bar periodically in synchronous relation to the oscillation of said device.

11. In a pretzel making machine, the combination with fingers for suspending an open loop and guides for holding the ends of said loop, of a revolving frame, a device provided with a pretzel holder mounted to oscillate in said frame, means for revolving said frame and causing said holder to pick up open loops held by said fingers and guides, gripping means journaled on said frame, mechanism whereby said gripping means are opened and permitted to close on the ends of said loops as they are lifted by said holder from said fingers and guides, mechanism for revolving said gripping means in sequence with the engagement of said loops thereby, means for rocking said device in sequence with the revolution of said gripping means, and cutters carried by said device for trimming the ends of said loops in sequence with the rocking of said device.

12. In a pretzel making machine, the combination with a stationary frame provided with cam mechanism, of a rotary frame carried by said stationary frame, an oscillatory plate carried by said rotary frame, means on said plate for engaging said cam mechanism whereby said plate is oscillated, a bar journaled on said rotary frame to the rear of said plate on an axis transverse to the axis of rotation of said rotary frame, spring pressed gripping devices fulcrumed on opposite ends of said bar, and cam mechanism for retracting said gripping devices in the rising movement of said bar when approximately parallel to the axis of said rotary frame.

13. In a pretzel making machine, the combination of a stationary frame, a rotary frame carried by said stationary frame, an oscillatory device comprising a pretzel holder carried by said rotary frame, cam mechanism whereby said device is oscillated, an oscillatory knock-off mechanism carried by said device, cam mechanism for oscillating said knock-off mechanism, a bar journaled on said rotary frame, spring pressed gripping devices fulcrumed on opposite ends of said bar, and cam mechanism for retracting said gripping devices.

14. In a pretzel making machine, a traveling belt for carrying and rolling dough, a revolving device to which the rolled dough is delivered, suspending means to which said revolving device delivers said dough, a revolving and oscillatory pretzel holding device adapted for picking said dough from said suspending means, means for twisting the dough carried by said holding device, means for oscillating said holding device to fold the twisted dough, and a traveling carrier to which said folded dough is delivered.

In testimony whereof I have hereunto set my name this 23 day of July, 1919.

JAMES G. ROBBINS.